E. M. SMITH.
HEADLIGHT.
APPLICATION FILED FEB. 10, 1917. RENEWED OCT. 9, 1919.
1,331,592.
Patented Feb. 24, 1920.
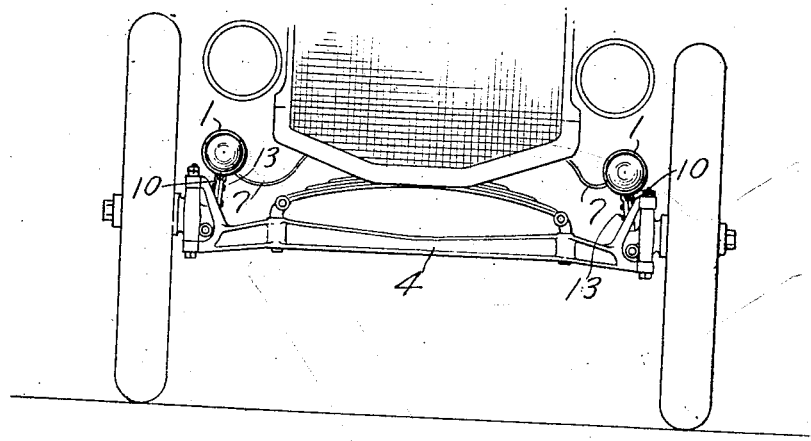
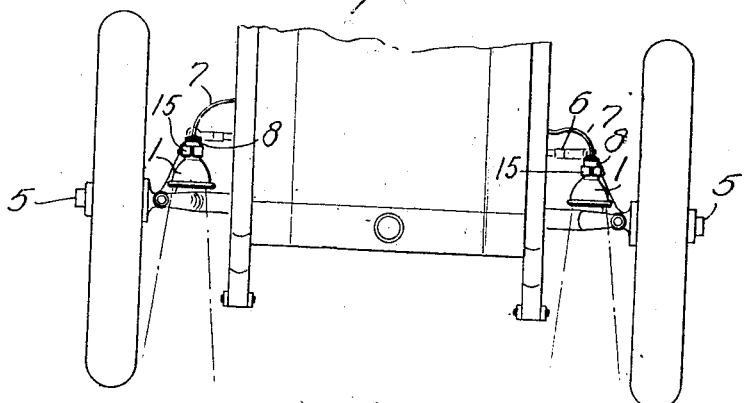
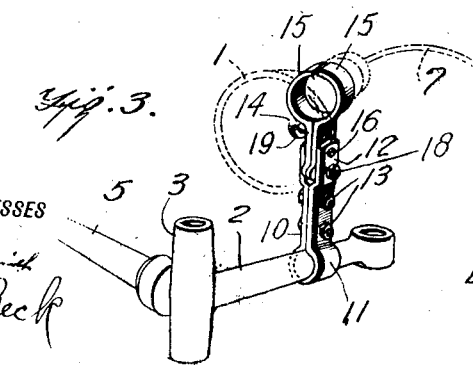
WITNESSES
INVENTOR
EZEKIEL M. SMITH
BY
ATTORNEYS

UNITED STATES PATENT OFFICE.

EZEKIEL M. SMITH, OF BIRMINGHAM, ALABAMA.

HEADLIGHT.

1,331,592.  Specification of Letters Patent.  Patented Feb. 24, 1920.

Application filed February 10, 1917, Serial No. 147,760. Renewed October 9, 1919. Serial No. 329,643.

*To all whom it may concern:*

Be it known that I, EZEKIEL M. SMITH, a citizen of the United States, and a resident of Birmingham, in the county of Jefferson and State of Alabama, have invented certain new and useful Improvements in Headlights, of which the following is a specification.

My invention is an improvement in headlights for motor vehicles, and has for its object to provide auxiliary lights connected with the steering gear in such manner that when the wheels of the vehicle are turned, the headlights will follow the turning movement to direct the rays thereof onto the road.

In the drawings:

Figure 1 is a partial front view of a motor vehicle provided with the improved headlights, Fig. 2 is a partial top plan view, Fig. 3 is a perspective view of a portion of the steering gear with the light supporting bracket, and Fig. 4 is a side view of the headlight.

The present embodiment of the invention is shown in connection with a motor vehicle, and the improved headlights 1 are supported by the steering arms 2 which extend radially from the bearing sleeve 3, which is connected with the front axle 4 and carries the spindle 5. The steering arms 2 are connected by a link 6, and the control mechanism is connected with the link.

The lamps 1 are electric lamps, being supplied by feed wires 7 in the usual manner, and each lamp is provided at the socket 8 thereof with an annular groove 9, with which the supporting bracket 4 of the lamp engages. The said bracket is composed of a lower portion and an upper portion, the lower portion being connected to the steering arm 2, while the upper portion is adjustable with respect thereto to permit the lamp to be tilted. The lower section is composed of similar sections 10, each in the form of a bar, having at its lower end a curved portion 11 for engaging the steering arm, and at the other end an outwardly offset portion 12. These portions 11 coöperate to grasp the steering-arm, and bolts and nuts 13 are provided for connecting the said sections.

The upper portion consists of similar sections 14, each having an outwardly curved portion 15 at its upper end for engaging about the lamp within the groove 9, and the lower ends of the sections are received between the outwardly offset portions 12 of the sections of the lower portion. A bolt 16 is provided for pivotally connecting the upper portion to the lower portion, and the sections of the upper portions have arc-shaped slots 17 registering with each other, and a bolt 18 is passed through the outwardly offset sections of the lower portions and through the slots to permit adjustment of the upper portion. By loosening the nut of the bolt, the upper portion may be moved with respect to the lower portion to permit adjustment. A set screw 19 is passed through the sections of the upper portions adjacent to the outwardly offset portions 15, to permit the said portions 15 to be clamped on the lamp.

One or both of the lamps 1 has its current supplying cable 7 winding upon a reel and of such length that it may be used as a trouble lamp at any part of the vehicle. The reel is spring controlled to wind up the cable automatically. The lamps are auxiliary lamps intended to be used when the large lamps are dim, or for any other reason when the large lamps are not in use.

I claim:

In a motor vehicle, the combination with the steering arms for the front spindles, of a bracket detachably connected with each arm and supporting a lamp to follow the movement of the wheels of the vehicle, said bracket comprising upper and lower portions, each portion being sectional, the upper portion engaging the lamp and the lower portion of the arm, the lower portion consisting of sections having outwardly offset portions at their upper ends and the upper portion having its lower end received between the outwardly offset portions and pivotally connected therewith, the lower end of the upper portion having an arc shaped slot and a bolt passing through the slot and the sections of the lower portion to permit adjustment of the upper portion.

EZEKIEL M. SMITH.